United States Patent Office 3,816,403
Patented June 11, 1974

3,816,403
DIGITOXSYL ACRYLONITRILE DERIVATIVES
Wolfgang Eberlein, Biberach (Riss), and Joachim Heider, Warthausen-Oberhofen, Germany, Walter Kobinger, Vienna, Austria, and Willi Diederen, Biberach (Riss), Germany, assignors to Boehringer Ingelheim GmbH, Ingelheim am Rhein, Germany
No Drawing. Filed Apr. 28, 1972, Ser. No. 248,523
Claims priority, application Germany, May 5, 1971, P 21 22 209.3
Int. Cl. C07c 173/00
U.S. Cl. 260—210.5  5 Claims

ABSTRACT OF THE DISCLOSURE

Compounds of the formula

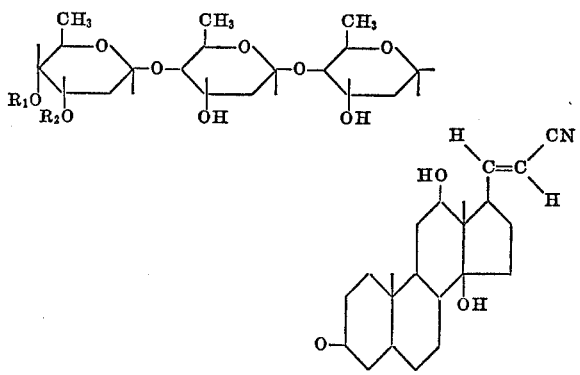

wherein $R_1$ is hydrogen or lower alkyl,
$R_2$ is hydrogen, lower alkyl or aliphatic acyl of 1 to 5 carbon atoms, and
$R_1$ and $R_2$ together are

where A and B are each lower alkyl;

the compounds are useful as cardiotonics.

---

The invention relates to novel cardiac-active steroid derivatives of γ-(3β-tridigitoxosyl-12β,14β-dihydroxy-5β-androstan-17β-yl)-acrylonitrile.

More particularly, the present invention relates to novel steroid derivatives of acrylonitrile of the formula

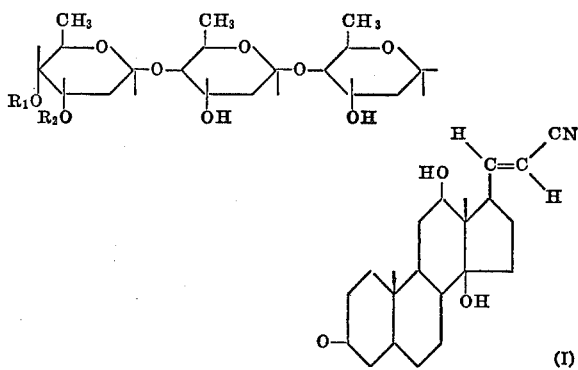

wherein $R_1$ is hydrogen or lower alkyl,
$R_2$ is hydrogen, lower alkyl or aliphatic acyl of 1 to 5 carbon atoms, and $R_1$ and $R_2$ together are

where A and B are each lower alkyl.

The compounds embraced by formula I may be prepared by any one of the following three reactions: (a) acylation, (b) alkylation, or (c) ketalization of the compound of the formula

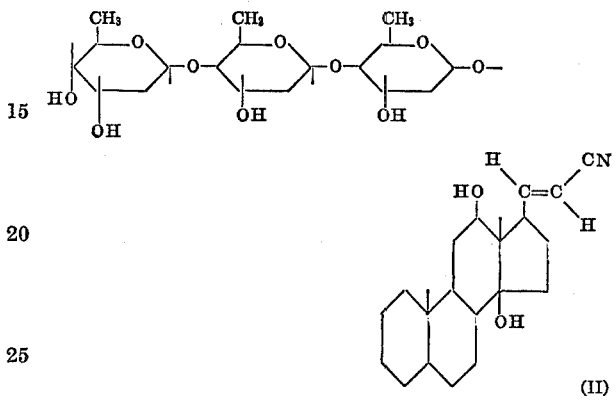

(a) The process of acylation of the hydroxyl group in the 3'''-position of the tridigitoxosyl group is carried out according to M. Jarmann et al., Chem. Ind., 1493 (1964) and L. Salce et al., J. Org. Chem. 35, 1681 (1970), by reacting of a compound of the formula II with an orthocarboxylate, followed by partial acid hydrolysis of the 3''',4'''-orthocarboxylate thus obtained. The preparation of this cyclic orthocarboxylate of the formula I is carried out by ester exchange with an excess of the corresponding aliphatic trialkyl orthocarboxylate in the presence of an acid as catalyst, and also preferably in the presence of an inert solvent. Examples of suitable acid catalysts are strong inorganic acids, such as hydrochloric acid or sulfuric acid; strong organic acids, such as p-toluene sulfonic acid, methanesulfonic acid, or trichloro-acetic acid; or Lewis-acids, such as boron trifluoride etherate; as well as acid ion exchangers. However, the use of hydrogen tetrafluoro-borate is especially preferable. Examples of suitable inert solvents are dimethylglycol or tetrahydrofuran; however, N-methylpyrrolidone is preferred. The reaction is effected between 0° C. and the boiling point of the solvent which is used, preferably at room temperature.

The stereospecific ring opening of the cyclic orthocarboxylate product, which does not necessarily have to be isolated, is carried out by treatment with any desired aqueous acid having a pH-value of at least 4 or less in an inert solvent. Suitable solvents include those previously mentioned. However, the partial hydrolysis is carried out preferably by treatment of the reaction mixture thus obtained with an aqueous acid. In this particular manner the 3'''-acyloxy compounds are exclusively isolated, since almost no 4'''-acyloxy compound is formed.

(b) The process of alkylation of a compound of the formula II is carried out with a conventional O-alkylating agent, such as with a diazoalkane, dialkylsulfate or alkylhalide. A mixture of 3'''- and 4'''-alkyl ethers is always formed, which may be separated by column chromatography, by thin-layer chromatography or by multiple distribution in a suitable solvent mixture.

The alkylation with a diazoalkane, preferably with diazomethane, is carried out at room temperature in the presence of a dilute acid in an inert solvent and goes to completion within a few hours. Examples of suitable dilute acids are hydrogen tetrafluoroborate, or Lewis-acids, such as aluminum isopropylate, iron(III)chloride, boric acid or trialkyl borates. Examples of suitable inert solvents are methylene chloride, dimethylformamide or a mixture thereof.

The reaction of a compound of the formula II with an alkylhalide or dialkylsulfate is carried out in known manner by using about 1-2 equivalents of the said alkylation agents. The reaction mixture may optionally include an acid binding agent, preferably Ba(OH)$_2$/BaO.

(c) The process for the ketalization of a compound of the formula II is carried out by reaction with an aliphatic ketone, preferably however by ketal exchange with a dialkylketal, especially with the dimethylketal of the corresponding aliphatic ketone.

The ketal exchange is carried out in the presence of a catalytic quantity of an acid, for example, of p-toluene sulfonic acid or hydrogen chloride, and optionally in the presence of an inert solvent containing a trace of water. The corresponding dialkylketal or the corresponding free ketone may itself act as the solvent; however, solvents which are inert, such as aromatic hydrocarbons, may also be used. The reaction is preferably carried out at room temperature and will usually be completed within a few hours.

The ketal exchange reaction of a compound of the formula II with a free aliphatic ketone is carried out in the presence of a dehydrating agent at room temperature or at moderately elevated temperatures, preferably at temperatures between 20° C. and 30° C., and optionally in the presence of an inert organic solvent. An example of a preferable dehydrating agent is anhydrous copper sulfate. However, other dehydrating agents may also be used, for example, hydrochloric acid, p-toluene sulfonic acid, or Lewis-acids, such as boron trifluoride etherate or zinc chloride, as well as acid ion exchangers like Dowex 50. Suitable inert solvents that may be used include aromatic hydrocarbons; but it is preferred to use an excess of the ketone itself as the solvent medium.

The steroid derivative of acrylonitrile of the formula II used as starting compound is described in Belgian Patent 774,509.

The following examples further illustrate the present invention and will enable others skilled in the art to understand it more completely. It should be understood, however, that the invention is not limited solely to the particular examples given below.

Regarding the $R_f$-values, the abbreviations used in connection therewith have the following meanings:

KGHF=silica gel HF (Merck, Darmstadt)
KGG=silica gel G (Merck, Darmstadt)
KGW=silica gel (Woelm)
S=System

EXAMPLE 1

γ - {3β - [(3'''-Acetyl-β-D-digitoxosyl)-1'''→4'')-O-(β-D-digitoxosyl)-(1''→4') - O - (β-D-digitoxosyl)]-12β,14β-dihydroxy-5β-androstan-17β-yl}-acrylonitrile by process (a)

1.2 gm. (1.6 millimols) of γ-{3β-[(β-D-digitoxosyl)-(1'''→4'')-O-(β - D - digitoxosyl) - (1''→4') - O - (β-D-digitoxosyl)] - 12β,14β - dihydroxy-5β-androstan-17β-yl}-acrylonitrile were dissolved in 14.4 ml. of N-methylpyrrolidone and 14.4 ml. of triethyl orthoacetate. This solution was admixed with 2.4 ml. of a hydrogen tetrafluoro borate stock solution (prepared by addition of 0.1 ml. of a 35% tetrafluoro-boric acid solution to a mixture of 19 ml. of ether and 6 ml. of methylene chloride at 0° C.). Then the mixture was stirred for two hours at room temperature. The progress of the reaction was monitored by thin-layer chromatography. The reaction mixture containing the resultant orthoester was hydrolyzed by mixing therewith 7.2 ml. of 80% acetic acid at 0° C. After standing for six hours at room temperature, the reaction mixture was diluted with 100 ml. of ethyl acetate, extracted twice with a saturated aqueous sodium bicarbonate solution and washed neutral with water. After drying the reaction mixture over sodium sulfate, the solvent was removed in vacuo, and the residue was recrystallized from ether, yielding 670 mgm. (45% of theory) of the compound of the formula

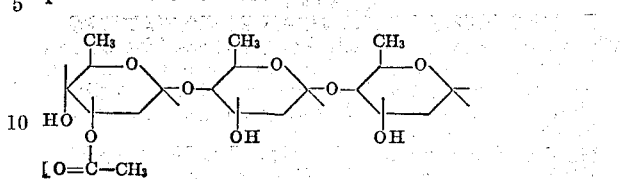

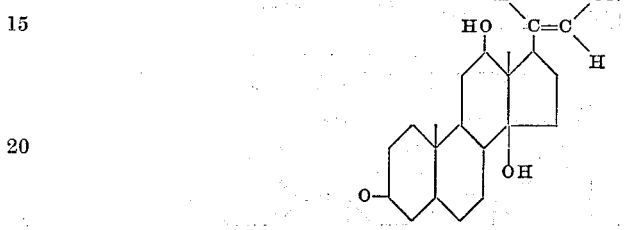

which had a melting point of 202–203° C. and an $R_f$-value of 0.55 (KGHF; S: ethyl acetate/ethanol=9/1).

EXAMPLE 2

γ-{3β-[(3'''-butyryl - β - D - digitoxosyl)-(1'''→4'')-O-(β-D-digitoxosyl)-(1'''→4') - O - (β-D-digitoxosyl)]-12β,14β - dihydroxy - 5β - androstan-17β-yl}-acrylonitrile by process (a)

1.4 gm. (1.87 millimols) of γ-{3β-[(β-D-digitoxosyl)-(1'''→4'') - O - (β-D-digitoxosyl)-(1''→4') - O - (β-D-digitoxosyl)] - 12β,14β - dihydroxy - 5β - androstan-17β-yl}-acrylonitrile was dissolved in 16.8 ml. of N-methylpyrrolidone and 16.8 ml. of triethyl orthobutyrate. This solution was admixed with 2.8 ml. of a tetrafluoro boric acid stock solution. This stock solution was prepared using a procedure analogous to that described in Example 1. After standing for two hours at room temperature, the reaction mixture was admixed with 8.4 ml. of 80% acetic acid at 0° C. in order to hydrolyze the resultant orthoester. After standing for six hours at room temperature, the reaction mixture was diluted with 100 ml. of ethyl acetate, extracted twice with saturated aqueous sodium bicarbonate solution and washed neutral with water. After drying the reaction mixture over sodium sulfate, the solvent was removed in vacuo and the residue was purified chromatographically on silica gel (chloroform/acetone=9:1 to 2:1).

Yield: 570 mgm. (37% of theory).
$R_f$-value: 0.4 (KGHF, S: ethyl acetate/ethanol=95/5).
Melting range: sintering beginning at 115° C.

EXAMPLE 3

γ-{3β-[(3''',4''' - O - isopropylidene - β - D - digitoxosyl)-(1'''→4'') - O - (β-D-digitoxosyl) - (1''→4')-O-(β-D-digitoxosyl)] - 12β,14β - dihydroxy-5β-androstan-17β-yl}-acrylonitrile by process (c)

1.2 gm. (1.6 millimols) of γ-{3β-[(β-D-digitoxosyl)-(1'''→4'') - O - (β-D-digitoxosyl)-(1''→4') - O - (β-D-digitoxosyl)] - 12β,14β - dihydroxy - 5β - androstan-17β-yl}-acrylonitrile was dissolved in 12 ml. of acetone and 12 ml. of 2,2-dimethoxypropane. This solution was admixed with 20 mgm. of p-toluene sulfonic acid and 5 drops of water. The reaction mixture was stirred for one hour at 0° C., and the progress of the reaction was monitored by thin-layer chromatography. Subsequently, the reaction mixture was diluted with 50 ml. of ethyl acetate, extracted twice with a saturated aqueous sodium bicarbonate solution and washed neutral with water. After drying this reaction mixture over sodium sulfate, the solvent was removed in vacuo and the residue was purified by chromatography on 200 gm. of silica gel (benzene/ethyl acetate=2/1).

Yield: 550 mgm. (43% of theory).
M.P.: 244–246° C. (corr., from methylene chloride/hexane).
$R_f$-value: 0.58 (KGW, S: ethyl acetate/ethanol=95/5).

EXAMPLE 4

γ-{3β-[3''',4'''-O-isopropylidene-β-D-digitoxosyl)-(1'''→4'')-O-(β-D-digitoxosyl)-(1''→4')-O-(β-D-digitoxosyl)]-12β,14β-dihydroxy-5β-androstan-17β-yl}-acrylonitrile by process (c)

1.2 gm. (1.6 millimols) of γ-{3β-[(β-D-digitoxosyl)-(1'''→4'')-O-(β-D-digitoxosyl)-(1''→4')-O-(β-D-digitoxosyl)]-12β,14β-dihydroxy-5β-androstan-17β-yl}-acrylonitrile were dissolved in 100 ml. of acetone containing 5 gm. of anhydrous copper sulfate and 12 ml. of 2,2-dimethoxypropane. This solution was stirred for 6–8 hours at room temperature. The progress of the reaction was monitored by thin-layer chromatography. After completion of the reaction, the copper sulfate was removed by vacuum filtration over Celite, and the clear filtrate was evaporated in vacuo. After chromatography on silica gel, 370 mgm. (28% of theory) of the desired compound was obtained, which was identical to the compound prepared according to the procedure described in Example 3.

EXAMPLE 5

3'''- and 4'''-monomethylethers of γ-{3β-[(β-D-digitoxosyl)-(1'''→4'')-O-(β-D-digitoxosyl)-(1''→4')-O-(β-D-digitoxosyl)]-12β,14β-dihydroxy-5β-androstan-17β-yl}-acrylonitrile by process (b)

1 gm. (1.3 millimols) of γ-{3β-[(β-D-digitoxosyl)-(1'''→4'')-O-(β-D-digitoxosyl)-(1''→4')-O-(β-D-digitoxosyl)]-12β,14β-dihydroxy-5β-androstan-17β-yl}-acrylonitrile and 0.5 gm. of aluminum isopropylate were dissolved in 5 ml. of dimethylformamide and 10 ml. of methylene chloride. This solution was admixed dropwise with 150 ml. of a 5% solution of diazomethane in methylene chloride over a period of 30 minutes. After two hours, the mixture was diluted with water and extracted several times with chloroform. The combined organic extracts were washed several times with water, dried over sodium sulfate and evaporated in vacuo. The resulting mixture containing the 3'''-monomethyl and the 4'''-monomethyl compounds was separated by preparative layer chromatography on silica gel by multiple development, in which the systems benzene/ethylacetate=2/1, 1/1, 1/2 and 1/4 were successively utilized in this order.

The higher substance band of the preparative layer chromatogram contained the 4'''-monomethyl-compound in pure form.

Yield: 270 mgm. (27% of theory).
$R_f$-value: 0.55 (KGW, S: ethyl acetate/ethanol=95/5).
NMR (CDCl$_3$, 60 megacycles): δ-OCH$_3$=3.42 p.p.m.

The lower substance band of the preparative layer chromatogram contained the 3'''-monomethyl-compound.

Yield: 180 mgm. (18% of theory).
$R_f$-value: 0.52 (KGW, S: ethyl acetate/ethanol=95/5).
NMR (CDCl$_3$, 60 megacycles): δ-OCH$_3$=3.45 p.p.m.

EXAMPLE 6

3'''- and 4'''-Monomethylethers of γ-{3β-[(β-D-digitoxosyl)-(1'''→4'')-O-(β-D-digitoxosyl)-(1''→4')-(β-D-digitoxosyl)]-12β,14β-dihydroxy-5β-androstan-17β-yl}-acrylonitrile by process (b)

1 gm. (1.3 millimols) of γ-{3β-[(β-D-digitoxosyl)-(1'''→4'')-O-(β-D-digitoxosyl)-(1''→4')-O-(β-D-digitoxosyl)]-12β,14β-dihydroxy-5β-androstan-17β-yl}-acrylonitrile was dissolved in 12 ml. of dimethylformamide and, while stirring the solution at 0° C., it was slowly admixed with 0.19 ml. of dimethylsulfate in the presence of 1.3 gm. of Ba(OH)$_2$ and 1.3 gm. of BaO. After stirring the reaction mixture for two hours at room temperature, the mixture was diluted with 100 ml. of chloroform and filtered. The filtrate was washed with water and evaporated in vacuo. The residue was purified by preparative layer chromatography analogous to that described in Example 5, yielding 370 mgm. (37% of theory) of the 4'''-monomethyl-compound and 220 mgm. (22% of theory) of the 3'''-monomethyl compound. Both compounds were identical to the compounds prepared according to the procedure described in Example 5.

As indicated above, the compounds according to the present invention, that is, those embraced by formula I above, have useful pharmacodynamic properties. More particularly, the compounds of the instant invention exhibit cardiotonic, and especially positive inotropic activities with a very good oral absorption rate in warm-blooded animals, such as rats.

The following representative compounds of the invention were tested for cardiotonic activity and oral absorption rate:

(A) γ-{3β-[(3''',4'''-O-Isopropylidene-β-D-digitoxosyl)-(1'''→4'')-O-(β-D-digitoxosyl)-(1''→4')-O-(β-D-digitoxosyl)]-12β,14β-dihydroxy-androstan-17β-yl}-acrylonitrile.

(B) γ-{3β-[(3'''-Acetyl-β-D-digitoxosyl)-(1'''→4'')-O-(β-D-digitoxosyl)-(1''→4')-O-(β-D-digitoxosyl)]-12β,14β-dihydroxy-androstan-17β-yl}-acrylonitrile.

(C) γ-{3β-[3'''-Butyryl-β-D-digitoxosyl)-(1'''→4'')-O-(β-D-digitoxosyl)-(1''→4')-O-(β-D-digitoxosyl)]-12β,14β-dihydroxy-androstan-17β-yl}-acrylonitrile.

Each compound was rated to determine its cardiotonic effect, especially the effect upon the isolated auricle of a guinea pig heart and to determine the oral absorption rate in rats.

Isolated guinea-pig auricles were suspended in normal tyrode solutions. Measured quantities of each compound were added to the respective solutions and the time interval from the initial addition of the glycoside to achievement of the maximum contraction was determined. The test was repeated at different concentrations of the test compound. From concentration-time curves plotted on semilogarithmic paper, the concentration ($EC_{10}$) was calculated by extrapolation which produced the maximum contraction in ten minutes. The enteral absorption rate in rats was determined by using the method of Greef, Arch. exper. Path und Pharmacol. *233*, 468 (1958). The results are summarized in the following table:

| Compound: | $EC_{10}$ (gm./ml.) | Absorption rate in percent after— 2 hours | 4 hours |
|---|---|---|---|
| A | $1.3 \cdot 10^{-6}$ | 50 | 65 |
| B | $9.0 \cdot 10^{-7}$ | 31 | |
| C | $1.3 \cdot 10^{-6}$ | 29 | |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective cardiotonic dosage unit of the compounds according to the present invention is from 0.002 to 0.033 mgm./kg. body weight.

The following examples illustrate a few dosage unit compositions comprising a compound of the present invention as an active ingredient and represent the best modes contemplated of putting the invention into practical use. The parts are parts by weight unless otherwise specified.

EXAMPLE 7

Tablets

The tablet composition was compounded from the following ingredients:

| | Parts |
|---|---|
| γ-{3β-[(3''',4'''-O-Isopropylidene - β - D - digitoxosyl) - (1'''→4'')-O-(β-D-digitoxosyl)-(1''→4')-(β-D-digitoxosyl)]-12β,14β-dihydroxy-5β-androstan-17β-yl}-acrylonitrile | 0.25 |
| Lactose | 85.75 |
| Potato starch | 30.00 |
| Gelatin | 3.00 |
| Magnesium stearate | 1.00 |
| Total | 120.00 |

Preparation: The active ingredient was intimately ground with ten times its weight of lactose. This mixture was mixed with the remaining lactose and with potato starch and granulated with a 10% aqueous solution of gelatin by passing it through a screen of 1.5 mm.-mesh size. The granulate was dried at 40° C., again passed through a screen of 1 mm.-mesh size and mixed with the magnesium stearate. Tablets were compressed out of the mixture, each having a weight of 120 mgm. Each tablet contained 0.25 mgm. of the steroid derivative of acrylonitrile and was an oral dosage unit composition with effective cardiotonic activity.

EXAMPLE 8

Coated Tablets

The tablet core composition was compounded from the following ingredients:

| | Parts |
|---|---|
| γ-{3β-[(3''',4'''-O-Isopropylidene - β - D - digitoxosyl) - (1'''→4'')-O-(β-D-digitoxosyl)-(1''→4')-(β-D-digitoxosyl)]-12β,14β-dihydroxy-5β-androstan-17β-yl}-acrylonitrile | 0.25 |
| Lactose | 32.25 |
| Corn starch | 15.00 |
| Polyvinyl pyrrolidone | 2.00 |
| Magnesium stearate | 0.50 |
| Total | 50.00 |

Preparation: The active ingredient was intimately ground with ten times its weight of lactose, mixed with the remaining lactose and with corn starch and granulated by passing the mixture through a screen of 1 mm.-mesh size using an aqueous 15% solution of the polyvinyl pyrrolidone. The granulate was dried at 40° C. and was again passed through the screen, mixed with magnesium stearate and subsequently compressed into 50 mgm.-tablet cores which were then coated with sugar and talcum in the usual manner and finally polished with beeswax. Each coated tablet contained 0.25 mgm. of the steroid derivative of acrylonitrile and was an oral dosage unit composition with effective cardiotonic activity.

EXAMPLE 9

DROP SOLUTION

The drop solution was compounded from the following ingredients:

| | Parts |
|---|---|
| γ - {3β[(4'''-Methyl-β-D-digitoxosyl)-(1'''→4'')-O - (β - O - digitoxosyl)-(1''→4')-O-(β-D-digitoxosyl)]-12β, 14β - dihydroxy - 5β-androstan-14β-yl}-acrylonitrile | 0.0125 |
| Sodium saccharin | 0.3 |
| Sorbitol | 0.1 |
| Ethanol | 30.0 |
| Flavoring | 1.0 |
| Distilled water, q.s.ad, 100.0 ml. parts by vol. | |

Preparation: The active ingredient and the flavoring were dissolved in ethanol; and this mixture was mixed with a solution of sorbitol and sodium saccharin in water and then filtered until free of fibres. 1 ml. of the drop solution (about 20 drops) contained 0.125 mgm. of the steroid derivative of acrylonitrile and was an oral dosage unit composition with effective cardiotonic activity.

EXAMPLE 10

Hypodermic solution

The hypodermic solution was compounded from the following ingredients:

| | Parts |
|---|---|
| γ - {3β - [(4'''-Methyl-β-D-digitoxosyl)-(1'''→4'')-O - (β - D - digitoxosyl) - (1''→4') - O-(β-D-digitoxosyl)] - 12β,14β-dihydroxy-5β-androstan-17β-yl}-acrylonitrile | 0.25 |
| Polyethyleneglycol 600 | 150.0 |
| Tartaric acid | 5.0 |
| Distilled water, q.s. ad 3000.0 parts by vol. | |

Preparation: The tartaric acid, the polyethyleneglycol and the active ingredient were successively dissolved in distilled water. The solution was diluted with distilled water to the indicated volume and filtered until free of fibres. The solution was filled into white 3 ml. ampoules in a nitrogen atmosphere and sterilized for 20 minutes at 120° C. Each ampoule contained 0.25 mgm. of the steroid derivative of acrylonitrile and its contents were an injectable dosage unit composition with effective cardiotonic activity.

EXAMPLE 11

Suppositories

The suppository composition was compounded from the following ingredients:

| | Parts |
|---|---|
| γ - {3β - [(3''' - Acetyl - β - D - digitoxosyl)-(1'''→4'') - O - (β-D-digitoxosyl)-(1''→4')-O - (β - D - digitoxosyl)] - 12β,14β-dihydroxy - 5β-androstan-17β-yl}-acrylonitrile | 0.25 |
| Lactose | 4.75 |
| Suppository base (e.g. cocoa butter) | 1695.00 |
| Total | 1700.00 |

Preparation: The active ingredient was ground with the lactose and stirred into the molten suppository base at 40° C., using an immersion homogenizer. 1700 mgm. portions of the mixture at 37° C. were poured into cooled suppository molds and allowed to cool therein. Each suppository contained 0.25 mgm. of the steroid derivative of acrylonitrile and was a rectal dosage unit composition with effective cardiotonic activity.

Analogous results are obtained when any one of the other steroid derivatives of acrylonitrile embraced by formula I is substituted for the particular steroid derivative of acrylonitrile in Examples 7 to 11. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

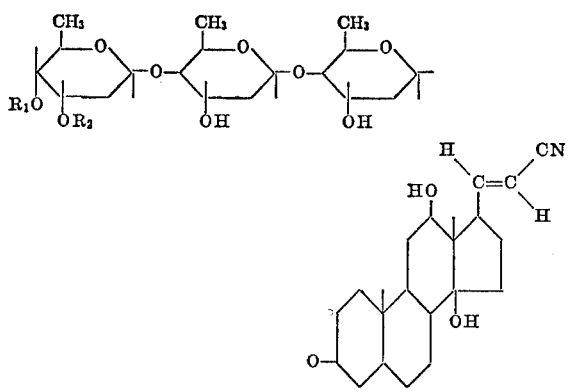

wherein
$R_1$ is hydrogen or lower alkyl,
$R_2$ is hydrogen, lower alkyl or aliphatic acyl of 1 to 5 carbon atoms,
provided, however, that $R_1$ and $R_2$ are other than both hydrogen at the same time, and
$R_1$ and $R_2$ together are

where A and B are each lower alkyl.

2. The compound according to claim 1, which is γ-{3β - [(3''',4''' - O - Isopropylidene-β-D-digitoxosyl)-(1'''→4'') - O - (β - D - digitoxosyl)-(1''→4')-O-(β-D-digitoxosyl)] - 12β,14β - dihydroxy - 5β-androstan-17β-yl}-acrylonitrile.

3. The compound according to claim 1, which is γ-{3β - [(4''' - Methyl - β - D - digitoxosyl)-1'''→4'')-O-(β - D - digitoxosyl) - (1''→4')-O-(β-D-digitoxosyl)]-12β,14β - dihydroxy - 5β-androstan-17β-yl}-acrylonitrile.

4. The compound according to claim 1, which is γ-{3β - [(3''' - Acetyl - β-D-digitoxosyl)-(1'''→4'')-O-(β-D - digitoxosyl) - (1''→4') - O - (β-D-digitoxosyl)]-12β,14β-dihydroxy-5β-androstan-17β-yl}-acrylonitrile.

5. The compound according to claim 1, which is γ-{3β - [(3''' - Butyryl - β - D - digitoxosyl)-(1'''→4'')-O - (β - D - digitoxosyl)-(1''→4')-O-(β-D-digitoxosyl)]-12β,14β-dihydroxy-androstan-17β-yl}-acrylonitrile.

References Cited
UNITED STATES PATENTS 3,538,078   11/1970   Kaiser et al. _____ 260—210.5
3,579,499   5/1971    Clarkson _____ 260—210.5

JOHNNIE R. BROWN, Primary Examiner
C. B. OWENS, Assistant Examiner

U.S. Cl. X.R.
424—182